Sept. 25, 1962 I. M. BERNSTEIN ETAL 3,055,117
ARTICLE AND METHOD FOR CONCEALING A RESPONSE
OR ITEM OF INFORMATION
Filed Jan. 11, 1960
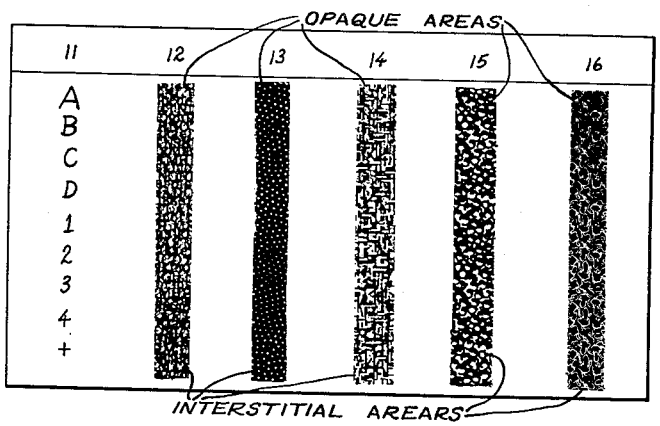
FIG. 1
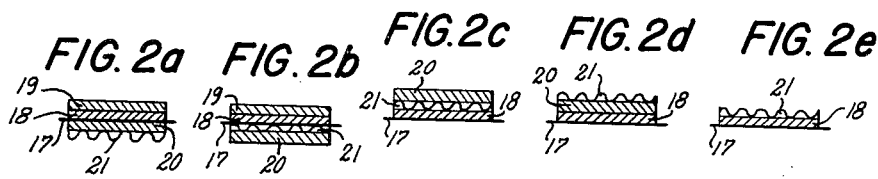
FIG. 2a  FIG. 2b  FIG. 2c  FIG. 2d  FIG. 2e
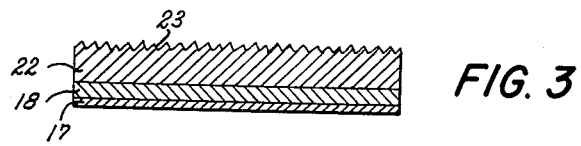
FIG. 3
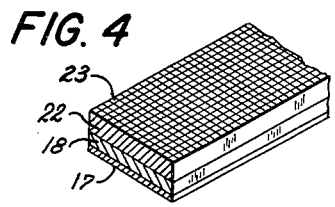
FIG. 4
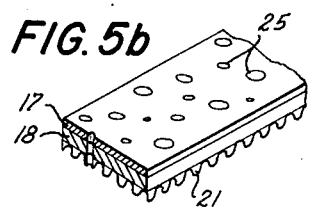
FIG. 5b
FIG. 5a
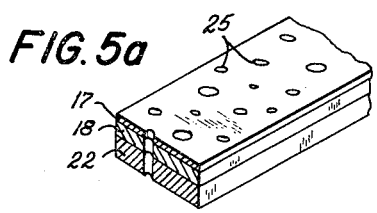
INVENTORS
ISIDOR M. BERNSTEIN
EDGAR N. GRISEWOOD
JOSEPH DWIGHT VAN VALKENBURGH
RICHARD S. NEVILLE
BY Kane, Dalsimer & Kane
ATTORNEYS

United States Patent Office 3,055,117
Patented Sept. 25, 1962

3,055,117
ARTICLE AND METHOD FOR CONCEALING A RESPONSE OR ITEM OF INFORMATION
Isidor M. Bernstein, New York, N.Y., Edgar N. Grisewood, Riverside, Conn., and Joseph Dwight Van Valkenburgh, Yonkers, and Richard S. Neville, New York, N.Y., assignors to Van Valkenburgh, Nooger and Neville, Inc., New York, N.Y., a corporation of New York
Filed Jan. 11, 1960, Ser. No. 1,792
2 Claims. (Cl. 35—9)

This invention relates in general to an article of manufacture and a method of making the same whereby printed information representing a response to previously conveyed information is temporarily concealed from the observer until the observer makes a decision to select that particular response and it is particularly applicable to improvements in a method and apparatus for entertaining, testing or instructing a person engaged in study problems and for testing and recording the accuracy of the selected responses.

In one form of the prior art a study problem is outlined on apparatus consisting of a series of related charts. At least one of the charts is provided with obscured items of information or responses. After considering the subject matter and the problem outlined, the participant tests his understanding of the problem by selecting and uncovering in succession various items of information which help him to form a judgment, leading ultimately to the uncovering of what he expects is the final answer to the study problem.

A number of procedures for obscuring the responses or items of information have been proposed, for example: providing a ribbon or tape superimposed over the responses and which can be scratched away to reveal the selected answers; printing the responses in invisible ink which when treated by proper solvent, chemical, or exposure to proper light rays, reveals the selected answer; and printing a uniform shield of so-called opaque ink which can be abrasively removed to expose the hidden response.

When small structures, for example, printed matter on a sheet of material such as paper are to be concealed by a uniform opaque shield, which opaque shield may be applied by conventional graphic arts methods, difficulties are encountered. These difficulties arise through the fact that thin films or multi-layers thereof containing so-called "opaque" pigments are rarely truly opaque to both reflected and transmitted light. These thin films are ordinarily between about 4 and 75 microns in thickness. The printed matter sought to be concealed may be revealed by reflected light or what is hereinafter referred to as "show through" or the printed matter may be revealed by transmitted light which is hereinafter referred to as "see through". While "see through" and "show through" may be minimized by the application of a plurality of uniform layers of obscuring media, such a method of application of such media contributes to the cost and complexity of manufacturing concealed units. In addition, it has been the prior art practice to resort also to additional shielding media on the back side of the printed sheet to minimize "see through" observation thereby further adding to the cost and complexity of the process.

"See through" and "show through" are always undesirable because, at worst, they reveal the entire response and, at best, they reveal the presence or absence of a response. If the response constitutes simply the presence or absence of some indicia then of course the lack of complete concealment of that indicia will result in a complete revelation since the mere determination that indicia is present is all that is necessary to convey the entire response. If a response is so concealed that its presence or absence cannot be detected then there is a complete concealment of that response.

If the observer can determine the length or height of the response, these also are significant items of fragments of information. Just how many fragments of information are necessary to transmit the entire response will depend on the intelligence, experience and resolving power of the particular observer and the nature of the response itself, that is, if the response is a phrase, sentence, word, numeral etc.

When utilizing uniform opaque layers, revelation of the response is also aided in part by the participant being able easily to distinguish between the response and the uniform hiding layer. In other words there is no confusion between the response and the hiding media.

It is an object of the present invention to overcome the difficulties and disadvantages heretofore encountered in utilizing uniform opaque layers of hiding media and to provide an improved article and method of the above character in which printed structures such as a response to previously conveyed information is effectively concealed from the observer so that he can not determine its presence, absence, nature or position; which can be economically produced by graphic art methods; and in which the printed structures or responses can be readily revealed when selected by simple abrasive means such as an erasure.

The objects of the invention are accomplished by utilizing the hiding media to confuse the participant and to render the response and the hiding media indistinguishable and thus conceal the presence, absence, nature or position of the response from the participant. This may be effectuated by careful attention being paid to a number of factors including the design, color and position of the hiding or confusing media. The hiding media which is in the form of a confusion pattern need not completely inhibit the transmission of light rays from the responses to the retinal screen of the eye. However, the confusion pattern must render any light rays which may be transmitted from the response to the eye indistinguishable from the light rays transmitted from the confusion pattern to the eye. It has been observed that a proper confusion pattern may be more readily obtained if part of the response itself is not covered by any portion of the confusion pattern.

This application is a continuation-in-part of our copending application Serial No. 662,182, filed May 28, 1957, now abandoned, on a technique and means for rendering certain material invisible.

In the accompanying drawings:

FIG. 1 is a plan view of an article having columns of data or responses printed thereon and in which the data in the first column is exposed and in the other columns is concealed by optically confusing shields;

FIG. 2a through 2d are schematic views hsowing the progressive development of moving a shield from the rear side of the sheet-like material to the front side thereof for the purpose of explaining the invention and FIG. 2e represents the ultimate wherein only one layer of a hiding media is utilized.

FIG. 3 is a fragmentary cross-section of an article containing printed data or responses hidden from view by a relatively opaque covering provided with a light scattering surface for the purpose of eliminating "show through";

FIG. 4 is a fragmentary perspective view of the embodiment of FIG. 3; and

FIGS. 5a and 5b are perspective views of a cross-section of a modified form of device embodying our invention in which pierced points extend through the device and for the purpose of better illustrating the pierced points, are inverted with respect to the other figures of the drawing.

Broadly stated, the present invention contemplates an article of manufacture and the method for making the same for completely concealing a structure from visual observation by means of a pattern causing optical confusion.

The term "conceal" or "concealing" is used in its ordinary sense and it is intended to mean that the presence, absence, nature or position of the aforementioned response or item of information cannot be determined by the observer. However, for purposes of emphasis and at the cost of redundancy the terms "complete concealment" and "completely concealing" etc. will be used interchangeably therewith.

Complete concealment can be obtained by positioning a confusion pattern of the type disclosed herein adjacent to the structure to be concealed, and between the structure to be concealed and the point of observation. The confusion pattern may comprise a plurality of light absorbing or light transmitting areas, such as, lines, forms or spots separated from one another by physical or optical interstices, or light reflecting patterns, or light scattering or diffracting patterns. For any given structure the confusion pattern may advantageously combine any one or more elements of color, form, size, orientation and contrast which will best control the structure by optical confusion as to the interpretation of the image obtained on the human retinal screen.

We have observed and empirically obtained confusion patterns by a variety of designs and have discovered and determined guide posts to aid in selecting a confusion pattern for a given response. It has been observed that a confusion pattern is more readily obtainable if the pattern is irregular and non-repetitious; if the pattern consists of the same indicia as that of the response and the pattern is translated and/or rotated in random registers; if the pattern generally corresponds to the response in the prominent characteristics of the response such as curves, angles and solids. Also it has been observed that one may perfect a selected confusion pattern which does not quite completely conceal the response by adding to the imperfect pattern irregular and unevenly spaced dots or a splash pattern in patches of similar size to the openings in the imperfect pattern. These dots may be either openings in the pattern or may be more opaque than the remainder of the pattern. Also an imperfect confusion pattern may be perfected by piercing the confusion pattern and the associated sheet means thereby forming point sources of relatively intense illumination as will be explained in more detail later herein. Also it has been found that if slight variation in color occurs between the response layer and the confusion layer, complete concealment is more readily obtainable if the confusion pattern is darker or of a more saturated hue as compared to the response, with hue being defined as the amount of color in contrast to white. The foregoing arrangement also causes the observer to experience eye fatigue when he attempts by a concentrated effort to ascertain the information hidden by the confusion pattern. The confusion pattern initially creates optical confusion which leads to a general fatigue upon a concentrated staring at same. This phenomenon causes the observer's eye to avoid automatically a concentrated attempt to ascertain the information in the normal use of apparatus embodying the invention.

In carrying the invention into practice, particularly with respect to the concealing of structures printed on a sheet-like supporting member such as paper, the confusion pattern is advantageously positioned in a layer superimposed either directly on the printed layer or separated therefrom by one or more transparent layers of ink. If the sheet-like means or material is a transparent material such as a thick plastic film, an additional confusion layer may be applied on the surface opposite the surface on which the concealed matter is printed. The confusion pattern is advantageously removable segment-wise by mild abrasive means, such as a pencil eraser, which does not substantially affect the underlying printed structure or response be it letter, numeral, symbol, illustration or other printed structure. The pattern which is removable segment-wise may be, and advantageously is formed of a removable printing ink. One particular advantage of a confusion pattern in which some portions of the response and the area proximate to the response are exposed is that there is less ink present then there is when a uniform layer or layers of opaque removable ink are utilized and is therefore easier to remove.

Under certain circumstances, the confusion pattern first chosen is imperfect and does not completely conceal the response. In this situation the imperfect confusion pattern may be perfected as previously suggested or may be combined with an opaque or substantially opaque layer of printing ink in such fashion that not only the nature of the structure but also its presence and position may be concealed. However, if the confusion pattern itself is chosen properly, although a somewhat empirical choice in some circumstances, it is unnecessary to combine the confusion pattern with an opaque or substantially opaque layer of printing ink to completely conceal the response. When the printed structures are applied on a sheet-like supporting member which is transparent or translucent, a confusion pattern may be applied on each surface thereby minimizing the chance of visual observation of the concealment structure from either direction.

Referring now to the drawing, FIG. 1 illustrates some of the many optically confusing patterns which may be positioned between the printed structure to be concealed and the point of observation. Column 11 shows the information which is to be concealed. This information is repeated in columns 12 through 16 but in each case is concealed by a pattern in accordance with the present invention. Column 12 utilizes a pattern comprising an alphabetical maze in both line and half tone screen. Column 13 utilizes a pattern comprising an absorbing field having a plurality of irregular dot-like interstices. Column 14 utilizes a pattern comprising a maze of plus signs combined with dots. Columns 15 and 16 illustrate irregular and non-repetitious patterns.

It is to be noted that in selecting the design of a pattern to effect complete concealment, the area and shape of the interstices of such pattern and the area and shape of the printed portion of the pattern should be considered in light of the dimensions and shape of the matter to be hidden thereby. That is, we have found that if at least approximately fifty percent of the response itself is actually covered by the opaque portions of the confusion pattern, complete concealment of the response is more readily obtained. An examination of FIG. 1 will show that the opaque portions of the confusion patterns illustrated therein will cover at least approximately fifty percent of the responses themselves.

While FIG. 1 illustrates the present invention with the use of black and white figures, it is within the contemplation of the present invention to utilize the advantages to be afforded by colored pigments. For example, when the printing or other information to be concealed is colored, the confusion pattern may advantageously be of the same color. Similarly, fluorescent pigments and pigments of color, complementary to the color of the printing to be concealed, may in certain instances be advantageous. Both color and contrast of the confusion pattern should be taken into consideration when selecting a pattern to conceal any particular structure. Thus the color of the confusion pattern should not reveal the concealed structure and the form of the pattern should confuse the characteristic outline of the concealed structure and the confusion should be such that neither the outline nor the presence, absence, nature or position of the concealed structure can be determined by the observer.

It is to be observed that light reflecting patterns, similar to the light absorbing patterns illustrated in FIG. 1, may also be employed in any given instance. The light reflecting patterns may be produced with the use of inks having light reflecting pigments. It is to be observed that in specific cases the light reflecting pattern may be replaced by transmitted light sources which are also effective in complete concealment. For example, in the complete concealment of structures printed on paper or other sheet-like supporting members and covered by a uniform relatively opaque shielding layer which is partially transparent or translucent to light, the paper or other sheet-like means may advantageously be pierced at a plurality of points. In this instance, when "see through" observation by transmitted light is attempted, the points at which the paper is pierced become point sources of relatively intense illumination. The contrast between the intense light sources and the light reflecting and light absorbing opaque areas, creates optical confusion and effectively conceals the printed structures. These pierced points can be comprised of different diameter holes and can be irregularly spaced. FIG. 5a illustrates such a structure and contains the sheet-like means 17, the responses 18 printed thereon, the uniform relatively opaque erasably removable shielding layer 22 printed over the responses 18 and the plurality of pierced points 25. FIG. 5b also illustrates such a structure and contains sheet-like means 17, the responses 18 printed thereon, an erasably removable layer in the nature of a confusion pattern 21, that is, initially designed to completely conceal the responses but which fell short of the goal printed over the responses 18, and the plurality of pierced points 25.

Reference is now made to FIGS. 2a through 2d, which figures illustrate, in cross-section a sheet-like supporting member 17 such as a sheet of paper containing printed tabulation responses 18 hidden from observation by a removable, uniform solid and seemingly opaque ink 19. Such a structure may be employed to construct simulation apparatus. Responses 18 are exposed to view by removal of overlying ink 19. To decrease the chances of observation of responses 18, it has been found that the addition of an opaque shield 20, such as a layer of ink, juxtaposed responses 18 but on the rear surface of sheet 17 somewhat increases concealment of responses 18, note FIG. 2a. In addition, concealment, particularly with respect to "see through," is further increased by applying an optical confusion pattern 21 over the outside surface of shield 20, also as shown in FIG. 2a.

We have found that the concealment characteristics of the structure can be further increased by reversing the positions of shield 20 and pattern 21 on the rear surface of sheet means 17 such that confusion pattern 21 lies directly against sheet-like means 17, as shown in FIG. 2b. This arrangement may be brought about by applying the optical confusion pattern 21 contiguous to sheet means 17 and backing same with an opaque shield 20.

In addition, we have found that better concealment results from the arrangement shown in FIG. 2c. In this embodiment, the optical confusion pattern 21 is now placed directly upon tabulation 18, that is to say between responses 18 and the point of observation, and shield 20 is placed over pattern 21.

Also, we have found that even better results flow from the arrangement of FIG. 2d wherein shield 20 and the optical confusion pattern 21 are orientated so that confusion pattern 21 faces the observer. In this last instance, it will be understood that there is no need for applying a shield on the rear surface of sheet means 17, as often resorted to in the prior art. We have found that for concealment of responses on a sheet-like supporting member that the movement of a confusion pattern progressively from rear to front, as shown by FIGS. 2a and 2d, progressively increases the effectiveness of concealment.

Complete concealment of the response can be obtained, of course, without using a continuous opaque shield by simply superimposing over the responses a perfected optical confusion pattern which has been carefully selected in accordance with the techniques described and illustrated, as for example by arranging the pattern so that at least approximately 50% of the response is covered by the opaque areas of the pattern. This is illustrated in FIG. 2e and is shown therein the sheet means 17, the responses 18 printed thereon and a confusion pattern 21 imprinted thereover. FIG. 2e illustrates the ultimate in design wherein the use of superfluous layers of opaque ink is entirely avoided.

FIGS. 3 and 4 illustrate a practical application of a light scattering pattern for the purpose of hiding printed structure 18 on sheet means 17. Initially and in accordance with the prior art, printed structure was hidden by an overlayer or thin uniform film of removable opaque ink 22. While the term opaque is used here, it has been found that such films of ink are not always perfectly opaque with respect to "show-through" and consequently printed structure 18 has been observed by reflected light. Such "show-through" renders the apparatus ineffective when used for simulation devices. We have found that this situation may be corrected by providing an effective light scattering pattern on surface 23 facing the point of observation, by deforming such surface. Deformed surface 23 scatters the reflected light effectively to conceal the sealed structure. In the case of concealment of comparatively large area structures or response, a pattern is set up which will scatter light in a plurality of directions by the use of differing angles of incidence and reflection at various points across the dimensions of the structure. In the case of printed structures such as 18, inadequately concealed from "show-through" by a seemingly opaque overlayer such as 22, the same effect may be obtained by embossing, scoring, or otherwise deforming surface 23 of opaque layer 22.

It is also within the scope of the present invention to effect some of the results desired by means of utilizing erasable inks which contain irregular opaque particles of structure similar to or different from the pigment of the ink.

Since many changes can be made in the above described embodiments and many apparently widely different embodiments of this invention can be made without departing from the scope thereof, it is intended that all matter contained in the above description or shown in the accompanying drawings shall be interpreted as illustrative and not in a limiting sense.

What is claimed is:

1. A teaching or testing device for temporarily and completely concealing the presence, absence or content of a given response or item of information from an observer until that observer has, based on previously conveyed information, chosen said given response comprising, a supporting sheet, information conveying material imprinted thereon and comprising a plurality of responses, and an optically confusing concealing layer overlying said responses and positioned between the underlying responses and the point of observation of the observer, said concealing layer being removable selectively in chosen areas and comprising a combination of opaque areas which to the unaided human eye are solidly opaque and of interstitial areas which optically contrast with the opaque areas, said areas being irregularly interspersed and intermingled to form an optically confusing and eye fatiguing pattern and with at least 50% of said information conveying material being covered by said areas which are solidly opaque to the unaided human eye whereby said information conveying material is completely concealed so that its presence, absence or content cannot be determined by an observer either by transmitted or reflected light.

2. A teaching or testing device for temporarily and completely concealing the presence, absence or content of a given response or item of information from an observer until that observer has, based on previously conveyed information, chosen said given response as set forth in claim 1 in which pierced points extend through said sheet at random areas to provide random light transmitting sources contrasting with the opaque areas of said optically confusing pattern, thereby contributing to the optical confusion and eye fatigue.

References Cited in the file of this patent

UNITED STATES PATENTS

| | | |
|---|---|---|
| 356,695 | Reid | Jan. 25, 1887 |
| 1,454,837 | Smith | May 8, 1923 |
| 1,829,250 | Walker | Oct. 27, 1931 |
| 2,280,409 | Keeley | Apr. 21, 1942 |
| 2,764,821 | Buitenkant | Oct. 2, 1956 |